United States Patent [19]

Köethmann et al.

[11] 4,197,535
[45] Apr. 8, 1980

[54] PULSE RADAR DEVICE HAVING PULSED STORAGE DEVICES ARRANGED IN THE SIGNAL ANALYSIS COMPONENT

[75] Inventors: Wolfgang Köethmann, Feldafing; German Gstöttner, Munich, both of Fed. Rep. of Germany

[73] Assignee: Siemens Aktiengesellschaft, Berlin & Munich, Fed. Rep. of Germany

[21] Appl. No.: 909,466

[22] Filed: May 25, 1978

[30] Foreign Application Priority Data

Jun. 29, 1977 [DE] Fed. Rep. of Germany ....... 2729436

[51] Int. Cl.² .................................................. G01S 7/44
[52] U.S. Cl. ............................... 343/5 DP; 343/5 VQ; 343/17.1 R
[58] Field of Search ............ 343/17.1 R, 5 VQ, 5 DP

[56] References Cited

U.S. PATENT DOCUMENTS

| 4,014,018 | 3/1977 | Williams et al. | 343/5 VQ |
| 4,106,019 | 8/1978 | Alexander | 343/5 DP |

FOREIGN PATENT DOCUMENTS 2540584  3/1977  Fed. Rep. of Germany.
1235750  6/1971  United Kingdom.

Primary Examiner—Maynard R. Wilbur
Assistant Examiner—Richard E. Berger
Attorney, Agent, or Firm—Hill, Van Santen, Steadman, Chiara & Simpson

[57] ABSTRACT

A pulse radar device had pulsed storage devices which are arranged in the signal analysis component and comprise, in particular, shift registers. The clock frequency for the shift registers is derived from a reference frequency. Within the radar period duration, a first time zone is defined as the actual analysis zone and signal processing is carried out with the clock frequency predetermined by the requisite range resolution, and a second time zone is defined (dead zone) in which a different clock frequency is selected. The second time zone is divided into at least two subsidiary zones, in the first of which a clock frequency is used which is derived as a whole number from the reference frequency and the level of which is selected to be such that the passage of the information through the registers in the storage device is terminated and in the second subsidiary time zone until the end of the radar period duration, the entire system is disconnected—at least in respect of the clock frequency—and no shifting of information occurs.

4 Claims, 4 Drawing Figures

FIRST TIME ZONE | SUBSIDIARY TIME ZONES
SECOND TIME ZONE

DOPPLER FILTER BZ (FIG.1)

PULSE RADAR DEVICE HAVING PULSED STORAGE DEVICES ARRANGED IN THE SIGNAL ANALYSIS COMPONENT

BACKGROUND OF THE INVENTION

1. Field of the Invention

The present invention relates to a pulse radar device having pulsed storage devices arranged in the signal analysis component, and is more particularly concerned with such an arrangement in which the storage devices comprise shift registers whose control pulse train is derived from a reference frequency, and wherein, within the radar period duration, two time zones are defined, an actual analysis zone in which signal processing is carried out with the pulse train frequency determined by the requisite range resolution, and a second time zone, a dead zone, in which a different pulse train frequency is selected.

2. Description of the Prior Art

The German Published Application No. 18 15 660, which corresponds to British Letters Patent No. 1,235,750 discloses a pulse radar device in which, in FIG. 2 thereof, the time between two transmitted pulses is divided into two time zones. In the first time zone, a counter is actuated which is started on the transmission of a transmitted pulse and which releases the timing pulses to the shift registers of the radar device for a specific length of time. At the end of the specific length of time, but before the transmission of the next transmitted pulse, the timing pulse feed is interrupted and, consequently, the mode of operation of the shift registers of the radar device is changed.

The German Published Application No. 25 40 584 is concerned with the problem which occurs when radar devices operate with a variable pulse frequency. The mode of operation of the shift registers required in the radar device for the digital signal processing in that system, for example, is such that the signal values in a first time zone of the receiving period are processed independently of the relevant pulse repetition frequency with the pulse train frequency provided for the shortest period duration at the maximum pulse repetition frequency. In the case of operation with a lower pulse repetition frequency, during the remainder of the time resulting from the extended period duration, the supply of input signals and/or the further processing of the echo signals is blocked.

The German Published Application No. 25 40 584 also poses another solution to the problem occurring in the event of a change in the pulse repetition frequency of the radar device, wherein, in the event of a transfer to a lower pulse repetition frequency, the pulse train frequency for the shift register is transferred in the same ratio so that the same number of register positions in the shift register is always used, whereas the pulse train frequency experiences a corresponding change. The pulse train frequency for the keying of the transmitter, for the transmitting-receiving transfer switch, and for the pulse trains for the shift registers is derived from a common pulse generator, and it is necessary to produce a number of shift pulse trains for controlling the registers which corresponds to the number of desired range channels within the period duration.

When shift registers are used which have a specific length which is normally greater than the special register length required for the processing of the signals, difficulties frequently occur. For example, the requirement can exist that 110 channels (range channels) are required for the range resolution, whereas 128 storage positions are available in the registers. From the German Published Application No. 25 40 584 it is known that the shift pulse trains for the production of the relevant range channels can consist of whole number multiples of the pulse frequency. Making the shift pulse train frequency a whole numbered multiple of the pulse repetition frequency has the advantage that, although spectral components occur as interferences, spectral components are suppressed by the blocking zones of the moving target filters as they correspond approximately in their spectral distribution to that of a so-called fixed target.

In the second time zone, i.e. in that zone within the receiving period which, with a lower pulse repetition frequency, occurs as residual time, it is possible to employ a heavily decelerated shift pulse train in accordance with the German Published Application No. 25 40 584. However, all the values must have passed through the entire shift register by the beginning of the next receiving period. As the first time zone, i.e. the actual receiving zone, is predetermined and the pulse repetition frequency and thus the period duration are also established, it is no longer possible to freely select the second time zone within the period duration. On the other hand, the remaining number of registers of the shift registers still available at the end of the receiving zone is likewise predetermined, so that the processing can meet with considerable difficulties as too many parameters are fixed. For example, in most cases with the known realization mentioned above, the shift pulse train frequency for the second time zone will not be able to be selected in a simple whole numbered ratio to the frequency of the first sub-zone. This results in the need for an increased expense in control devices (a special, additional pulse generator or the like) for the production of the pulse train frequency.

SUMMARY OF THE INVENTION

The object of the present invention is to overcome the aforementioned difficulties and to provide a technique which, with simple means and without special, additional pulse generators, enables the control of the registers to be carried out with technical satisfaction also in the second time zone.

According to the invention, this object is achieved in that the second time zone is divided into at least two subsidiary zones. In the first subsidiary zone, a pulse train frequency is used which is determined as a whole number from the reference frequency and the level is selected to be such that the passage of information through the registers in the storage device is ended. In the remaining subzone until the end of the radar period duration, the entire system is disconnected—at least in respect of the control pulse train—and no shifting of information takes place.

The slight extra expense which is involved, due to the fact that the second time zone is divided into two subsidiary zones, cannot be compared with the additional expense which is otherwise required when it is necessary to make available a special pulse generator which must provide the counting pulse trains for the second time zone for the predetermined, remaining register positions which are not freely selectable in number. In addition, the requirement is fulfilled that the sequence of the stored items of information should be maintained and that these should again be available at the correct time during the next period.

In accordance with an advantageous further development of the invention, the time zones can be produced simply with a companion counter which is set to corresponding counting values and which is supplied with the reference frequency as a counting pulse train and which, when the relevant counting values have been reached, causes the pulse train frequency to be transferred or disconnected.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
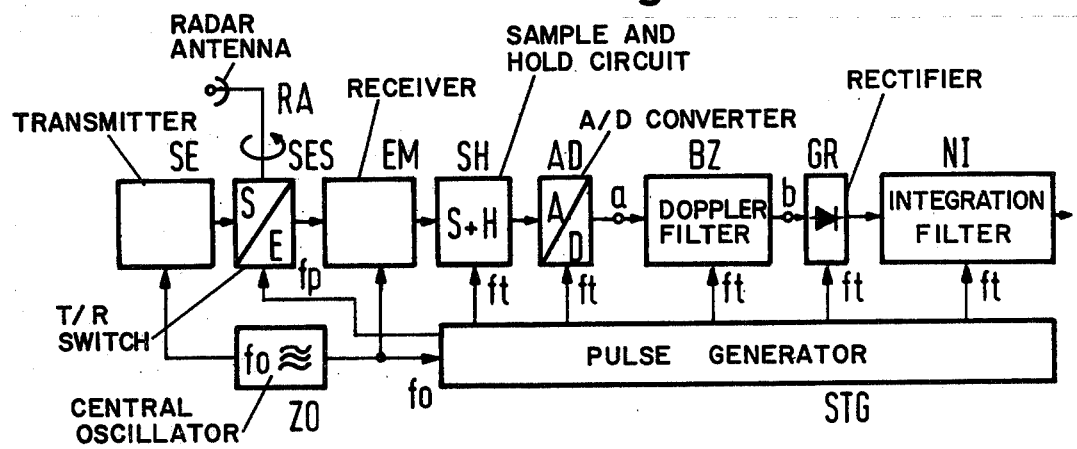
FIG. 1 is a block circuit diagram of a pulse radar device having a corresponding pulse train supply device.

In the block circuit diagram illustrated in FIG. 1, the system is seen to comprise a radar antenna RA, a transmitter SE, a transmitting-receiving switch SES, and a receiver EM. The transmitted signals are derived from a central oscillator ZO at a frequency of fo. With coherent mixing, the heterodyne frequency for the receiving mixer (not illustrated in detail) in the receiver EM is also derived from the oscillator ZO. The receiver EM is followed, for further signal processing, by a sample and hold circuit SH, an analog/digital converter AD, a moving target filter (Doppler filter) BZ, a video rectifier GR and a post integration filter NI.

With time-quantized processing of the information of the echo signals, thus for example in the case of processng with digital filters or pulsed analog filters, the various modules which are arranged following the radar receiver EM, thus is the actual signal analysis component, must be supplied with a specific operating pulse train. This operating pulse train ft (the clock pulse frequency) is supplied by a pulse generator STG which is likewise supplied with the reference frequency fo from the central oscillator ZO. The clock frequency ft is whole-numbered multiples of the pulse repetition frequency fp of the radar device so that the equation $$fp \cdot m = ft$$

holds true, where m is a whole number. The pulse repetition frequency fp is also expediently produced in the pulse generator STG from where it is fed, for example, to the transmitting-receiving switch SES. In the following, the explanation of the invention will be based upon a numerical example for which the following definitions apply:

Reference frequency fo = 2000 kHz;
Register positions in the storage device = 128;
Pulse repetition frequency fp = 2 kHz;
Period duration T = 500 μs;
Number of range channels e = 110;
Opening time per range channel te = 4 μs; and
First time zone (i.e. echo transit time to be detected) T1 = 440 μs.

Assuming that the time zone T1 begins immediately following the emission of the transmitted pulse, the second time zone (dead time) T2 of the radar device amounts to 500 μs − 440 μs = 60 μs. As the time te = 4 μs is available for a range channel, the clock frequency ft1 must be selected to be such that it has a period duration of 4 μs. In the present example, this means a clock frequency ft1 of 250 kHz. Here, it has been assumed that one sample specimen is processed in each range channel. The relationship ft1 = fo:n exists between the .eference frequency fo and the clock frequency ft1, where n is a whole number and, in the present case, should be selected to be 8.

Figure 3:
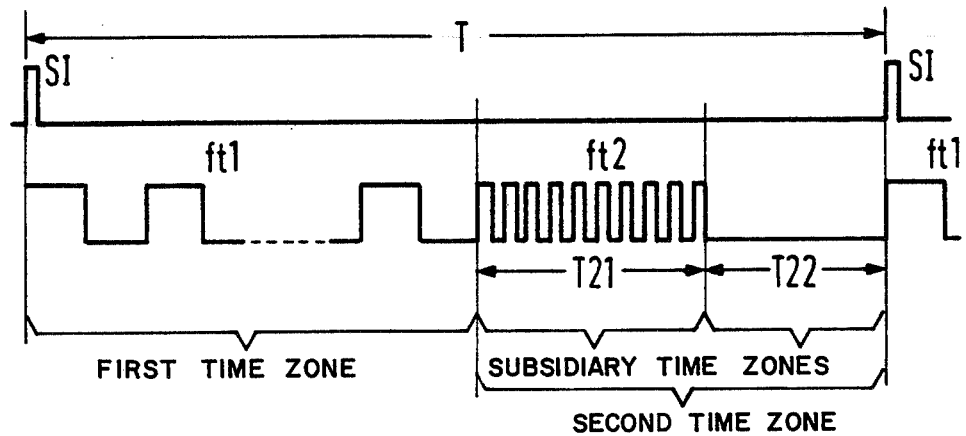
FIG. 3 is a pulse-time diagram provided as an aid to understanding the invention.

Therefore, in accordance with the pulse-time diagram in FIG. 3, beginning with the transmitted trigger pulse SI, first follow 110 timing pulses at a frequency ft1 (=250 kHz) which are logiclinked with the divider n of the reference frequency fo. During this length of time, the 110 register positions corresponding to the 110 range channels are shifted in a known manner in the shift registers of the individual stages of the analysis circuit of FIG. 1. At the end of this first time zone T1, in accordance with FIG. 3, a change occurs in the clock frequency in accordance with the equation ft2 = fo:k. In the present example it has been selected that k = 5 so that ft2 = 400 kHz and the associated period duration for the ft2 pulse trains amounts to 2.5 μs. For the remaining register positions, i.e. from the register 111 onwards to the register 128, a further total of 18 pulse trains having the clock frequency ft2 are required until the last register position (128) is reached. A time of 18·2.5 = 45 μs is required for this purpose (for the first subsidiary zone T21 of the second time zone T2 in FIG. 3).

Therefore, overall 440 μs + 45 μs = T1 + T21 has passed since the beginning of the transmitted pulse SI. The register contents has thus been completely passed through because a total of 128 shift pulses have been supplied. Consequently, the analysis circuit of the radar device can now be brought to a halt, and, upon a corresponding control command, the pulse train frequencies ft2 from the pulse generator STG in accordance with FIG. 1 are suppressed. The elements SH to NI in FIG. 1 no longer contain any operating pulse trains, and in fact until release again takes place with the next transmitted pulse SI and, in fact, again beginning with the frequency ft1. The duration of the second subsidiary zone T22 amounts to 500 μs − 485 μs = 15 μs, or, expressed in general terms, T22 = T − T1 − T21. This type of register control with the two subsidiary zones T21 and T22 has the advantage that the pulse train frequency ft2 for the first subsidiary zone T21 can be freely selected. Consequently, it is possible to derive this pulse train frequency ft2, in the same manner as the clock frequency ft1, from a common reference frequency and no additional pulse generator is required. If, in a known manner, the clock frequency for the second time zone were selected to be such that the entire time T2 was uniformly filled with pulse trains, it would have to possess a pulse train frequency of ftx = 300 kHz. As the frequency fo = 2000 kHz, it is not possible to obtain a value of ftx = 300 kHz with a whole-numbered divider ratio. Therefore, it would be necessary to additionally provide a pulse generator which, highly accurately, produces a pulse train frequency of 300 kHz.

A further difficulty in the use of an additional pulse generator resides in the fact that between the first clock frequency ft1 and the second clock frequency ftx there occurs an arbitrary phase relationship, thus phase errors occur in the transfer. On the other hand, when the derivation takes place from the common reference frequency fo with only a change in the division factor from n to k, the phase relationships remain rigidly linked, even in the case of transfer.

Figure 2:
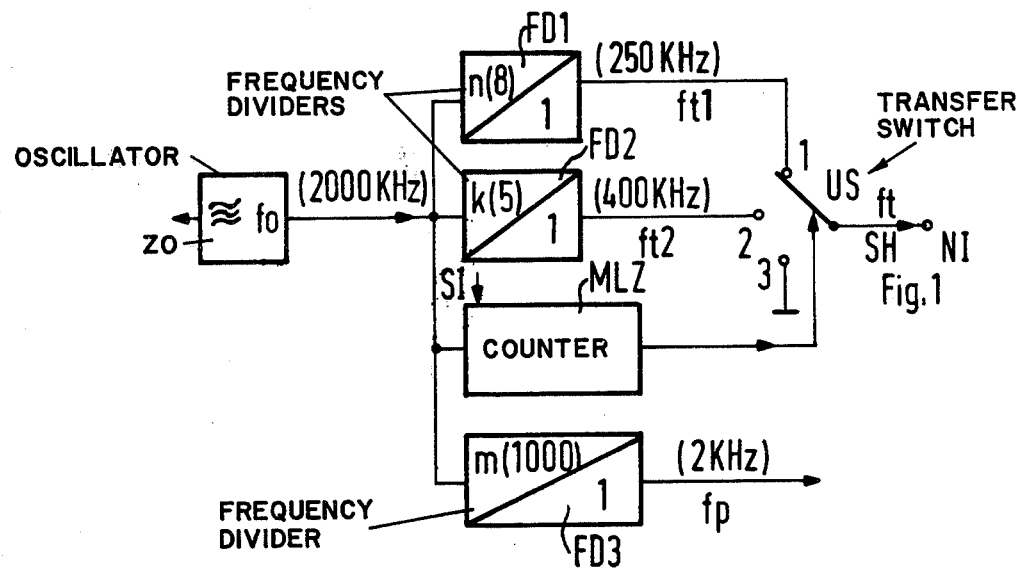
FIG. 2 is a block circuit diagram which illustrates the design of the control circuit for the production of two subsidiary time zones within the second time zone corresponding to the present invention.

In the block circuit diagram of FIG. 2, which shows details of the pulse generator STG of FIG. 1, the pulse repetition frequency fp=2 kHz is obtained by a frequency divider FD3 having a division ratio m:1 (in the present example 1000:1). By means of the frequency divider FD1 having a division ratio n:1 (in the present example 8:1), the clock frequency ft1 (in the present example 250 kHz) is produced and fed to the pulsed storage devices for the interval T1. For this purpose, the transfer switch US is connected to the terminal 1 at the output of the frequency divider FD1 for the time T1. The companion counter MLZ begins its counting process on the transmission of the transmitted trigger pulse SI in FIG. 3 and counts until the end of the first time zone T1. The counting values corresponding to the times T1, T1+T21, and T are stored in the counter MLZ, where the oscillations of the reference frequency fo serve as counting pulses. Following the end of the interval T1, the transfer takes place to the frequency divider FD2 whose division ratio is k:1 (in the present 5:1), and, in fact, following the switch-over of the transfer switch US to the terminal 2 at the output of the frequency divider FD2 at the instigation of a control command from the companion counter MLZ. The companion counter MLZ continues to count until the counting value corresponds to the time T1+T21 has been reached. Subsequently, a control command switches the transfer switch US to the terminal 3 which carries ground potential, and no further time pulses occur for the time interval T22. At the end of the period duration T, a third counting value is reached in the companion counter MLZ, the transfer switch US is switched to the terminal 1 and the process begins again with the frequency ft1.

Figure 4:
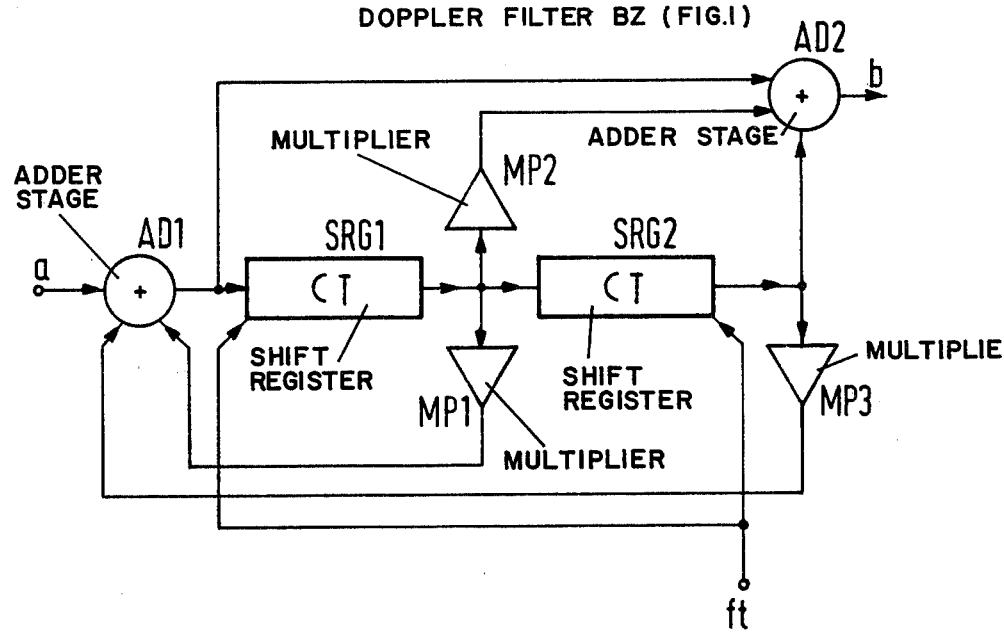
FIG. 4 is a schematic representation of a digital moving target filter as an exemplary embodiment of a circuit having pulsed storage devices.

In order to illustrate the construction of a known moving target filter (Doppler filter), FIG. 4 illustrates how the filter can be used, for example, in that part of FIG. 1 referenced BZ. At the input end and at the output end it contains respective adder stages AD1 and AD2 and two consecutive shift registers SRG1 and SRG2 whose delay time is, in each case, the interval T, i.e. equal to the radar period duration. The shift clock frequency is ft, i.e. alternately ft1, ft2 zero. Also provided are multipliers MP1—MP3 which multiply the digitalized amplitude value of each range channel by a specific factor.

Following a time interval 2T, i.e. in the "built up" state after two radar periods (2T), the newly incoming, first sampling specimen of the sampling period 3T arrives at the input terminal a from the first range channel and passes, for example, by way of the adder stage AD1 to the adder stage AD2. With the first pulse train (with ft1) of the radar period 3T, the sampling specimen (from the radar period 1T) of the first range channel stored in the shift register SRG2 is read therefrom and forwarded to the adder stage AD2. This is possible because the sampling specimen from the first range channel of the radar period 1T had already arrived following the time T+T1+T21 within the second radar period 2T at the end of the shift register SRG2 and was not advanced further in the time from T+T1+T21 to T+T1+T21+T22 (disconnection of the pulse train frequency for a time interval T22). Similarly, at the end of the radar period 2T, the sampling specimen of the first range channel from the radar period 2T has arrived at the end of the shift register SRG1 and with the first pulse train (with ft1) of the radar period 3T is read and forwarded, for example, to the adder stage AD2. Therefore, only signal components from identical range channels coincide in the adder stage AD2 and, likewise, for example in the adder stage AD1, and the moving target filter operates in the desired manner.

In place of digital shift registers, it is also possible to use pulsed, analog storage devices, for example in the form of capacitive charge stores (e.g. so-called charge-coupled device stores or CCD stores). It is also possible to provide more than one pulse train in the time interval T2 which, for example, can be effected by means of a further frequency divider in FIG. 2. The pulse train sequence ft2 would be followed, for example, by a further pulse train sequence ft3 and only then would a transfer to the terminal carrying ground take place.

Although we have described our invention by reference to particular embodiments thereof, many changes and modification of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A pulse radar device comprising: a transmitting device and a receiving device including a transmitter, a receiver, an antenna, a transmit/receive switch connecting said transmitter and said receiver to said antenna, a central oscillator connected to said transmitter and to said receiver, and means for analyzing a received signal over a predetermined interval connected to said receiver;

said analyzing means including a sample and hold circuit connected to said receiver and including a clock pulse input, an analog/digital converter connected to said sample and hold circuit, and including a clock pulse input, a Doppler filter connected to said analog/digital converter, and including a shift register for receiving and storing received signals and a clock pulse input, a rectifier connecting to said Doppler filter and including a clock pulse input, and an integration filter connected to said rectifier and including a clock pulse input;

clock means including a reference clock operating a reference frequency, said clock means connected to said clock pulse inputs for applying clock pulses thereto, including pulses to shift information in said shift register; and control means connected to said clock means and operable to cause said clock means to apply clock pulses at a first frequency during the first predetermined time section of said predetermined interval including dividing means for dividing a second predetermined time section of said interval into first and second sub-sections and applying pulses of a second clock frequency during the first sub-section and disconnecting the clock means during the second sub-section.

2. The pulse radar device of claim 1, wherein said control means comprises:
   a counter preset to a predetermined count, said counter connected to said clock and operable upon reaching said predetermined count to cause said control means to transfer from said first to second frequencies and from said second frequency to a disconnect of said clock pulses.

3. The pulse radar device of claim 1, wherein said clock means includes:
   a plurality of parallel-connected frequency dividers connected to said reference clock; and
   a transfer switch connecting said frequency dividers to said control means.

4. The pulse radar device of claim 3, wherein said transfer switch comprises a terminal connected to ground and is operable to apply ground to said control means during said second sub-section.

* * * * *